(12) United States Patent
Taniguchi (10) Patent No.: US 7,898,713 B2
(45) Date of Patent: Mar. 1, 2011

(54) IMAGE DISPLAY APPARATUS (75) Inventor: Naosato Taniguchi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1321 days.

(21) Appl. No.: 11/437,106

(22) Filed: May 19, 2006

(65) Prior Publication Data
US 2006/0291027 A1 Dec. 28, 2006

(30) Foreign Application Priority Data
Jun. 22, 2005 (JP) .............................. 2005-181988

(51) Int. Cl.
*G02B 26/08* (2006.01)
(52) U.S. Cl. .............. 359/213.1; 359/196.1; 359/197.1; 359/208.1; 359/212.1
(58) Field of Classification Search ... 359/196.1–226.2; 250/234–236; 347/233–261; 353/49–50, 353/66, 85; 345/7, 30, 32
See application file for complete search history.

(56) References Cited
U.S. PATENT DOCUMENTS
5,489,950 A 2/1996 Masuda 7,711,175 B2 * 5/2010 Endo et al. .................. 382/137
2004/0264006 A1 12/2004 Hatakeyama et al.

FOREIGN PATENT DOCUMENTS
| JP | 2004-094199 A | 3/2004 |
| JP | 2004-264670 A | 9/2004 |
| JP | 2005-024695 A | 1/2005 |

* cited by examiner

*Primary Examiner*—James Phan
(74) *Attorney, Agent, or Firm*—Canon USA Inc. IP Division (57) ABSTRACT

At least one exemplary embodiment is directed to an image display apparatus which displays an image on a surface to be scanned and includes a light source configured to emit a light beam modulated on the basis of image information, a scanner configured to scan the surface to be scanned with the light beam emitted from the light source, a light receiver configured to receive the light beam that is incident upon a particular area of the surface to be scanned when the surface to be scanned is scanned with the light beam, a first determiner configured to determine whether or not an output signal from the light receiver are output at a predetermined time interval, and a controller configured to control driving of the light source on the basis of a determination signal from the determiner.

9 Claims, 6 Drawing Sheets

IMAGE DISPLAY APPARATUS

BACKGROUND OF THE INVENTION

1. Field of the Invention

The present invention relates to a scanning-type image display apparatus which displays an image by performing two-dimensional scanning with a light beam modulated on the basis of image information and emitted from a light source unit.

2. Description of the Related Art

Various two-dimensional scanning-type image display apparatuses, which display a two-dimensional image by causing a scanning unit (such as a micromechanical mirror) to two-dimensionally scan a surface to be scanned with laser light, modulated on the basis of image information, and by making use of a residual-image effect of a light spot formed on the scanning surface have been discussed (refer to Japanese Patent Laid-Open No. 2004-264670 (no corresponding foreign documents) and U.S. Pat. No. 5,489,950).

Japanese Patent Laid-Open No. 2004-264670 (hereunder referred to as "Patent Document 1") discusses an image display apparatus which displays an image by performing two-dimensional deflection scanning on a scanning surface with a light beam that is deflected horizontally and vertically by two deflecting units (scanning units) comprising mirrors that are subjected to resonant driving.

In Patent Document 1, a high-definition image is displayed by using as a scanning unit, resonant deflectors which can deflect light at an equivalently high speed. In addition, Patent Document 1 discusses a method for controlling driving of the resonant deflectors with high precision.

U.S. Pat. No. 5,489,950 (hereunder referred to as "Patent Document 2") discusses a display apparatus which projects as a two-dimensional image a one-dimensional image subjected to deflection scanning by a deflecting mirror.

In Patent Document 2, a displacement angle of the deflecting mirror, which serves as a scanning unit and vibrates at a constant angle and at a constant period, is detected by a detector mounted to the deflecting mirror, and a scanning synchronization timing signal is generated on the basis of a signal obtained at the detector.

In such scanning-type image display apparatuses, a light beam can no longer properly scan the scanning surface due to a failure of the scanning unit. In such a case, it can be useful to stop driving the light source unit which emits a light beam modulated on the basis of image information.

In particular, when the light source unit is driven by, for example, a battery, in order to reduce the chance of battery exhaustion, it can be useful to perform an appropriate operation on the light source unit when a failure occurs in the scanning unit.

Patent Documents 1 and 2 do not discuss anything about, for example, what can be done when a failure occurs in the scanning unit or the light source unit.

SUMMARY OF THE INVENTION

The present invention is directed to an image display apparatus which can display a proper image as follows. An image can be formed by causing a scanning unit to perform two-dimensional scanning with light, when a failure occurs in the scanning unit or a light source unit or the scanning unit or the light source unit operates improperly, such a failure or improper operation can be detected at an early stage to perform an appropriate operation to correct and/or reduce the failure or improper operation.

According to an aspect of the present invention, an image display apparatus displays an image on a scanning surface. The image display apparatus includes a light source unit configured to emit a light beam modulated on the basis of image information, a scanning unit configured to scan the scanning surface with the light beam emitted from the light source unit, a light detecting unit configured to receive the light beam that is incident upon an area other than an image display area of the scanning surface when the scanning surface is scanned with the light beam, a determining unit configured to determine whether or not an output signal from the light detecting unit is output at a predetermined time interval, and a controlling unit configured to control driving of the light source unit on the basis of a determination signal from the determining unit.

According to another aspect of the present invention, another image display apparatus displays an image on a scanning surface. The apparatus includes a light source unit configured to emit a light beam modulated on the basis of image information, a scanning unit configured to scan the scanning surface with the light beam emitted from the light source unit, a light detecting unit configured to receive the light beam that is incident upon an area other than an image display area of the scanning surface when the scanning surface is scanned with the light beam, a determining unit configured to determine whether or not the light beam is moving two-dimensionally on the scanning surface by an output signal from the light detecting unit, and a controlling unit configured to control driving of the light source unit on the basis of a determination signal from the determining unit.

According to another aspect of the present invention, the image display apparatus further includes a monitoring unit configured to monitor a light output from the light source unit and a light output determining unit configured to determine that an output from the monitoring unit is equal to a predetermined output. In the image display apparatus, the controlling unit controls the driving of the light source unit by using a determination signal from the light output determining unit and the determination signal from the determining unit.

According to another aspect of the present invention, the image display apparatus further includes a warning unit configured to generate a warning sound or indicating a warning on the basis of the determination signal from the determining unit. Here, the warning unit is controlled by the controlling unit.

According to another aspect of the present invention, the image display apparatus further includes an optical system which guides the light beam from the scanning unit to the scanning surface. Here, the optical system includes two non-rotational symmetrical aspherical mirrors.

According to another aspect of the present invention, the scanning unit includes a reflecting-type deflecting unit which resonates. Here, the image is formed on the scanning surface in a forward path and in a return path, and the forward path and the return path is defined by oscillating movement of the deflecting unit resulting from the resonation of the deflecting unit.

According to another aspect of the present invention, a display position of the image that is formed on the scanning surface in a forward path and in a return path defined by the scanning unit whose oscillating movements is adjusted by the signal from the light detecting unit.

According to another aspect of the present invention, the controlling unit stops driving the light source unit when a determination signal from light output determining unit indicates an abnormal operation and the determination signal from the determining unit indicates a normal operation.

According to another aspect of the present invention, the light beam reaches the light detecting unit from the light source unit without passing outside the image display apparatus.

According to another aspect of the present invention, the light beam reaches the light detecting unit from the light source unit by only passing inside the image display apparatus.

According to another aspect of the present invention, an image is displayed by causing the scanning unit to perform two-dimensional scanning with a light beam, when a failure occurs in the scanning unit or the light source unit or the scanning unit or the light source operates improperly, it is possible to perform an appropriate operation to correct and/or reduce the failure or the improper operation.

Further features of the present invention will become apparent from the following description of exemplary embodiments with reference to the attached drawings.

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the mirror elements and their materials.

In all of the examples illustrated and discussed herein any specific values, for example signal spacing widths (e.g., $122a\_w$), should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Exemplary embodiments of the present invention will be described below.

First Exemplary Embodiment

Figure 1:
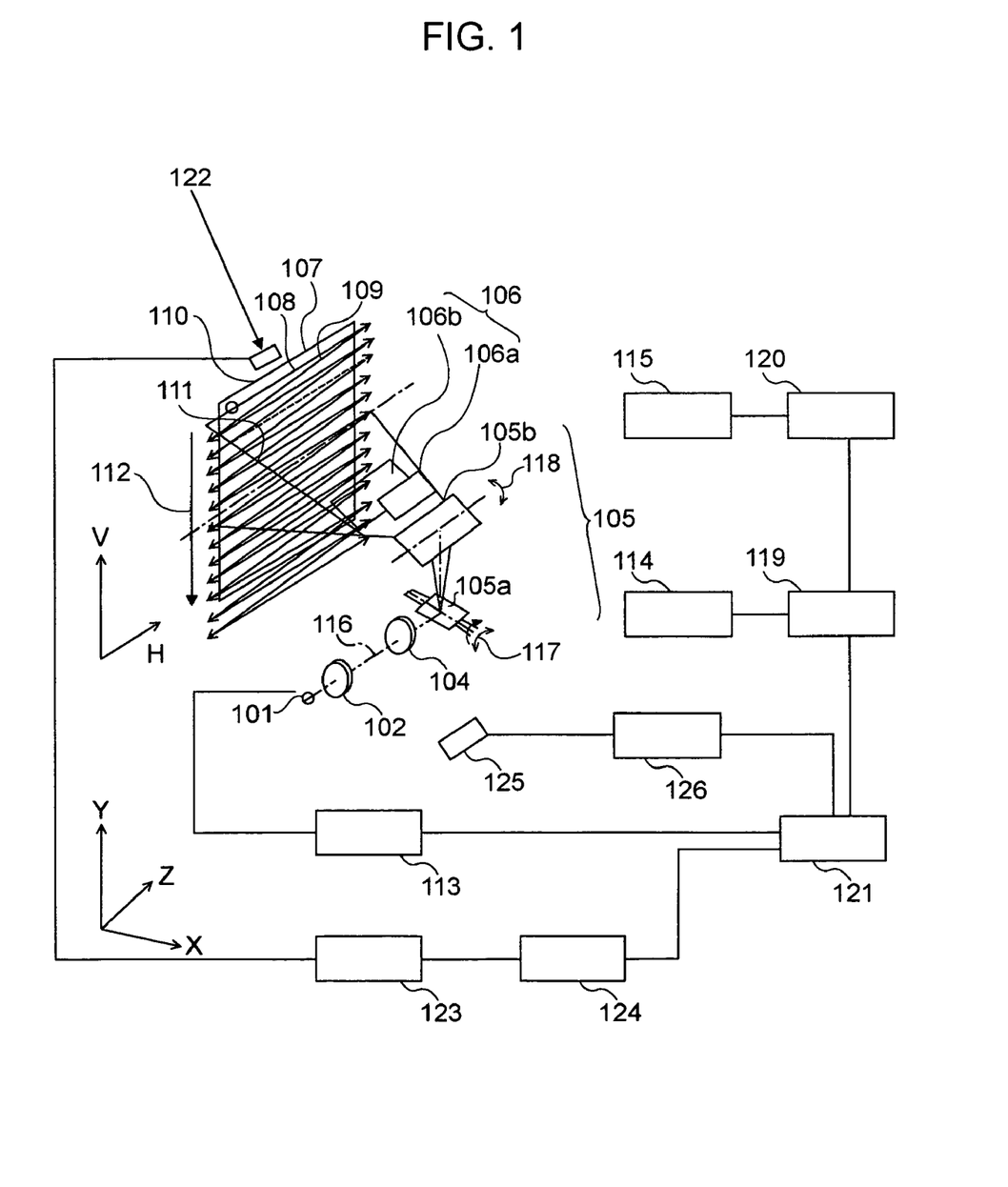
FIG. 1 is a schematic view of a structure according to a first exemplary embodiment of the present invention.

FIG. 1 is a schematic view of a main portion of a scanning-type image display apparatus according to a first exemplary embodiment of the present invention.

In FIG. 1, a light beam 116 modulated on the basis of image information and emitted from a light source unit (e.g., a semiconductor laser) 101 is incident upon a scanning unit (deflecting unit) 105 through a condensing lens 102 and a conversion optical system 104.

The scanning unit 105 includes a horizontal scanning portion (main scanning portion) 105a and a vertical scanning portion (subscanning portion) 105b. Here, a period of the subscanning portion 105b is shorter than a period of the main scanning portion 105a. The incident light beam can be used to perform two-dimensional deflection scanning.

The light beam used to perform two-dimensional deflection scanning by the scanning unit 105 scans a surface to be scanned 107, such as a screen or a wall, through an optical system 106 including a first mirror 106a and a second mirror 106b, such as two planar mirrors or reflecting mirrors having power.

The light beam emitted from the light source unit 101 is substantially condensed on the surface to be scanned 107 through optical units such as the condensing lens 102, the conversion optical system 104, and the optical system 106, and forms a light source image. Therefore, the light source image that is formed on the surface to be scanned 107 is subjected to two-dimensional scanning by the scanning unit 105.

The horizontal scanning portion 105a of the scanning unit 105 can be a resonant micromechanical mirror (MEMS mirror) formed by a semiconductor process, and can be formed so that its mirror surface oscillates movements by a mechanical resonant action.

The vertical scanning portion 105b of the scanning unit 105 is a mirror that is driven by a motor, such as a stepping motor, which can have a rotary shaft.

The horizontal scanning portion 105a is connected to a horizontal scanning unit driver 114 and a horizontal scanning unit driving circuit 119. The vertical scanning portion 105b is connected to a vertical scanning unit driver 115 and a vertical scanning unit driving circuit 120.

The light source unit 101 is connected to a light source driving circuit 113. The light source driving circuit 113, the horizontal scanning unit driving circuit 119, and the vertical scanning unit driving circuit 120 are connected to a system control circuit (controlling unit) 121 which controls a light emission time of the light source unit 101 and a deflection operation of the scanning unit 105 while synchronizing them. The system control circuit 121 performs a controlling operation on the basis of an image signal that is input to the system control circuit 121 from a signal inputting unit (not shown).

In FIG. 1, a double-headed arrow 117 denotes oscillating movement directions of the horizontal scanning portion 105a. The light beam deflected by the horizontal scanning portion 105a scans the surface to be scanned 107, so that, for example, a forward-path scanning line 108 and a return-path scanning line 109 are formed as illustrated in FIG. 1.

A double-headed arrow 118 denotes deflection directions of the vertical scanning portion 105b. Vibrating the vertical scanning portion 105b in the directions of the arrow 118 causes scanning of the surface to be scanned 107 in the direction of an arrow 112.

Therefore, the scanning lines that have moved forward and backward, such as the scanning lines 108 and 109, are formed on the surface to be scanned 107 vertically from the top to the bottom of the surface to be scanned 107.

When scanning of a bottommost portion of the surface to be scanned 107 is completed, the vertical scanning portion 105b returns to the upper end of the surface to be scanned 107 as indicated by a return line 111 to, thereafter, repeating the scanning operations.

The deflected light beam scans the surface to be scanned 107 up to its portion outside an effective area 110 of the surface to be scanned 107, and impinges upon a light detecting unit (synchronization light detecting unit) 122 which receives the light beam that impinges upon a particular area of the surface to be scanned when the light beam scans the location outside the surface to be scanned 107.

Here, the phrase "light beam that impinges upon a particular area of the surface to be scanned" does not actually refer to light that impinges upon a particular area of the surface to be scanned 107. As in the embodiment, the path of the light beam is bent in the apparatus, so that the light beam impinges upon the light detecting unit 122 (e.g., sensor or a photoelectric converter such as a charge-coupled device (CCD) or CMOS) disposed at a location that is optically substantially conjugate with respect to the surface to be scanned 107. In other words, the light reaches the light detecting unit 122 from the light source unit 101 without moving outside the image display apparatus (in other words, the light only travels within an outer box of the image display apparatus).

The phrase "Particular area of the surface to be scanned" refers to an area outside an area (image display area) on the surface to be scanned 107 where an image is formed, and is desirably an area which is outside the image display area in a subscanning direction (that is, a direction perpendicular to a direction of scanning of the MEMS mirror).

Then, a timing of scanning in a main scanning direction on the surface to be scanned 107 is adjusted using a signal obtained at the light detecting unit 122.

For example, if an SVGA image having 800 pixels in the horizontal direction and 600 pixels in the vertical direction exists in the effective area 110 of the surface to be scanned 107, when the scanning unit 105 is driven vertically at 60 Hz, the number of horizontal scanning lines in the forward path and in the return path is each 300, so that a resonant frequency of about 18 kHz is required in this non-limiting example.

For the sake of simplicity, FIG. 1 shows only some of the scanning lines.

Figure 2:
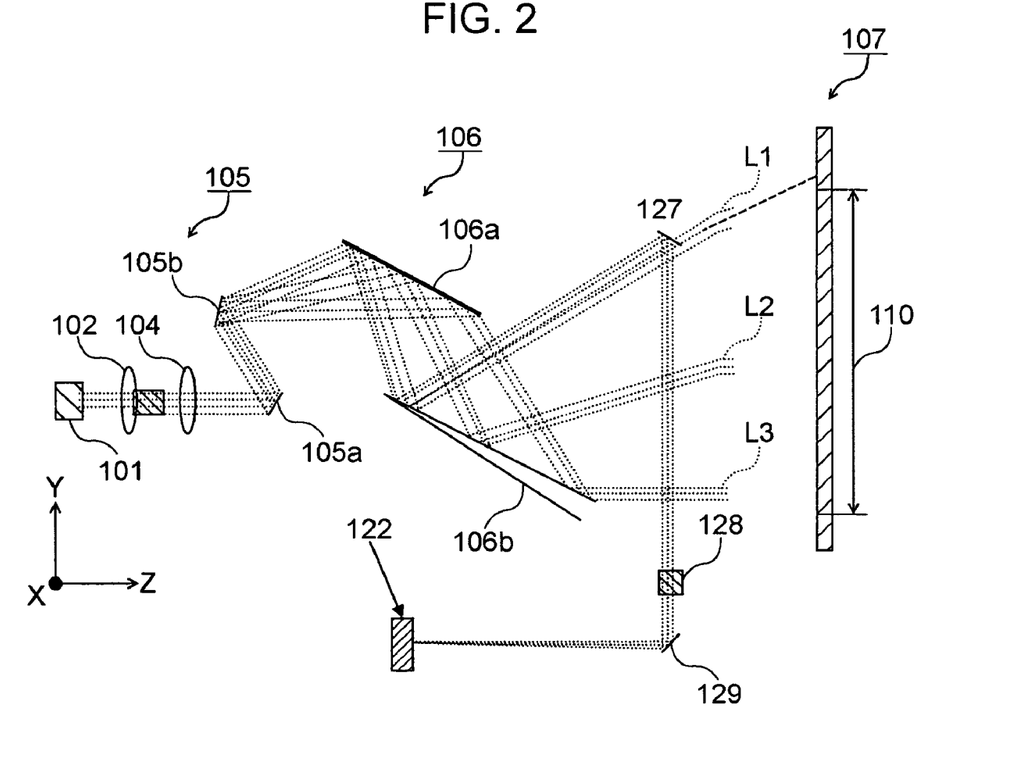
FIG. 2 is a vertical sectional view of light paths in the first exemplary embodiment of the present invention.

FIG. 2 is a vertical sectional view (YZ sectional view) of the optical systems of the scanning-type image display apparatus shown in FIG. 1.

The two-dimensional scanning optical system 106 includes, from a side of the scanning unit 105, the first mirror 106a and the second mirror 106b.

The first mirror 106a and the second mirror 106b are tilted only in a vertical scanning cross-sectional plane and are disposed so as to bend a path of a deflection light beam in a vertical scanning direction.

The mirrors 106a and 106b each have a non-rotational symmetrical aspherical surface (free-form surface). This facilitates proper correction of, for example, a TV distortion resulting from two-dimensional scanning or a trapezoidal distortion of a scanning image resulting from oblique projection of a light beam onto the surface to be scanned 107 in the vertical scanning direction.

FIG. 2 shows three light beams L1, L2, and L3 traveling towards the screen 107. Of these light beams, the topmost light beam L1 scans a location outside the effective area 110 of the surface to be scanned 107, and the path of this light beam L1 is bent at a folding mirror 127, which can have a housing (not shown) mounted thereto in correspondence with the path of the light beam L1. Then, the light beam L1 impinges upon the light detecting unit 122 through a mirror 129 to obtain a scanning timing signal.

Here, a condensing lens 128 is disposed in a light path between the mirror 127 and the 129 so that the light beam has a predetermined spot size on the light detecting unit 122.

Next, a detection of synchronization regarding a scanning image on the surface to be scanned 107 of the scanning-type image display apparatus according to the first exemplary embodiment will be described.

Figure 3:
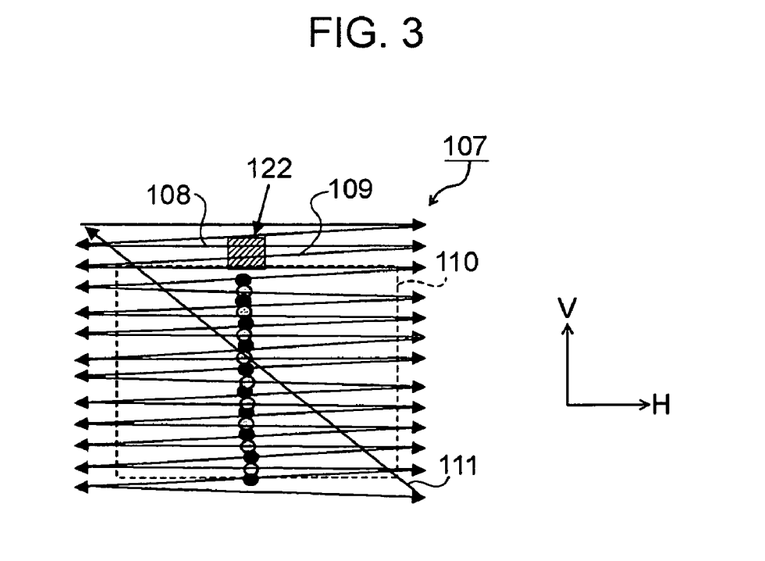
FIG. 3 illustrates a disposition of scanning light beams on a light detecting unit shown in FIG. 1.

As illustrated in FIG. 3, the light detecting unit 122 is disposed at the surface to be scanned 107 so as to be situated outside the effective area (effective scanning area) 110, where an image is actually displayed, in a vertical scanning direction V.

Actually, as illustrated in FIG. 2, the light detecting unit 122 is disposed at a location optically corresponding to (conjugate with respect to) the surface to be scanned by using the condensing lens 128 and the mirrors 127 and 129 mounted to the housing.

Here, an operation of the light detecting unit 122 will be described by being superimposed upon the exemplified scanning lines on the surface to be scanned 107.

Figure 4:
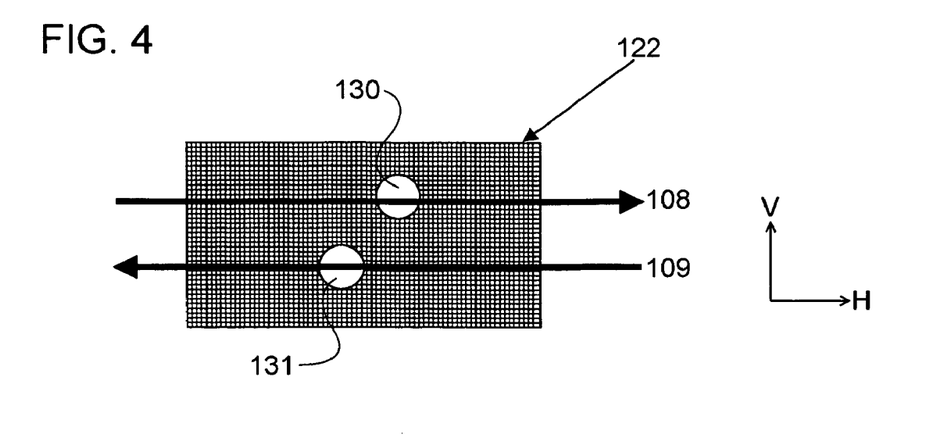
FIG. 4 illustrates a displacement of scanning light beams and aligning of the scanning light beams in a forward path and a return path on the light detecting unit shown in FIG. 1.

FIG. 4 schematically illustrates relationships between the scanning lines 108 and 109 and scanning light beams, on the light detecting unit 122 in FIG. 3.

In order to detect a displacement between a forward-path deflection light beam (scanning light beam) and a return-path deflection light beam (scanning light beam) in a predetermined time period, the following method is used. In this method, modulated light that turns the light source unit 101 on and off is deflected to form areas (hereunder referred to as "modulation spots") 130 and 131, which can have a luminance (light-quantity) distribution on the light detecting unit 122. Then, an interval between the modulation spots 130 and 131 is measured and determined.

For example, as illustrated in FIG. 3, the light source unit 101 is turned on once every time a predetermined time elapses during a period in which the light detecting unit 122 is scanned with the forward-path scanning line 108 and a period in which the light source unit 101 is scanned with the return-path scanning line 109, so as to form the modulation spots 130 and 131 (portions having the highest luminance formed by the scanning light beams).

Here, "predetermined time" refers to, as illustrated in FIG. 3, the time obtained by dividing a time interval for one frame by the number of scanning lines when detection is made by the modulation spot 130, which is set on in the forward path, and the modulation spot 131, which is set on in the return path (that is, when the detection time is shortest). For example, when one frame has a time interval of 1/60 seconds and SVGA (800×600 pixels, 300 scanning lines) is used, the predetermined time is 1/18000 seconds. However, when considering, for example, scanning stability and measurement time of the spot positions, the modulation spot 131 can be measured by delaying the setting on of the modulation spot 131 by one to a few frames. This time corresponds to the time that the scanning line 109 passes the light detecting unit 122 once for one frame (for example, 1/30 to 1/180 seconds, and, desirably, approximately 1/60 seconds).

Since, in the non-limiting example of the exemplary embodiment, one frame has a time interval of 1/60 seconds, the turning on of the modulation spot 131 is delayed by one frame or 1/60 seconds.

By this, viewing a distribution of a total charge amount guided by the modulation spots 130 and 131 on the light detecting unit 122 makes it possible to detect the positions of the modulation spots 130 and 131 on the light detecting unit 122 in a predetermined time.

Therefore, the use of the light detecting unit 122 for outputting a signal which can be used to measure a horizontal interval between the modulation spots 130 and 131 on the light detecting unit 122 facilitates the measurement of the horizontal displacement between the modulation spots 130 and 131 by the system control circuit 121.

An image sensor including a plurality of light-receiving areas (having predetermined sizes) can be used in the light detecting unit 122 in the first exemplary embodiment. For such a structure, the light detecting unit 122 can include a photoelectric converter, a charge accumulator which can accumulate the photoelectrically converted charges, and a transfer unit which transfers the accumulated charges.

In this case, since the light quantities of the modulation spots 130 and 131 can be detected for the plurality of light receiving areas, the positions of the modulation spots 130 and 131 on the photoelectric converter can be precisely determined.

The accumulated charges need not be transferred at a high speed in accordance with the scanning speed. It is possible to transfer them at a low speed after generating the modulation spots 130 and 131 on the light detecting unit 122. Therefore, even if the scanning speed at the light detecting unit 122 becomes high, it is possible to detect the displacement between the modulation spots 130 and 131.

Next, the controlling of the driving of the image display apparatus according to the first exemplary embodiment will be described with reference to FIG. 5. In the above-described description, an image is displayed on the surface to be scanned 107 when the entire apparatus is operating properly.

In this case, when a power supply of a device (not shown) is turned on, the system control circuit 121 starts operating, and, in accordance with an input of an image signal (not shown), as described above, the system control circuit 121 controls a timing at which the light source unit 101 is turned on so that it is in synchronism with the driving of the scanning unit 105. This causes an image to be displayed on the surface to be scanned 107.

For a synchronization signal at this time, a signal from the light detecting unit 122 for measuring the interval between the modulation spots 130 and 131 on the surface to be scanned 107 is used.

The horizontal scanning portion 105a of the scanning unit 105 used in the first exemplary embodiment is formed so as to oscillate movement by a mechanical resonant action, and the light detecting unit 122 is disposed at a substantially central portion of the surface to be scanned 107 outside the effective area (display effective area) 110.

Figure 5A:
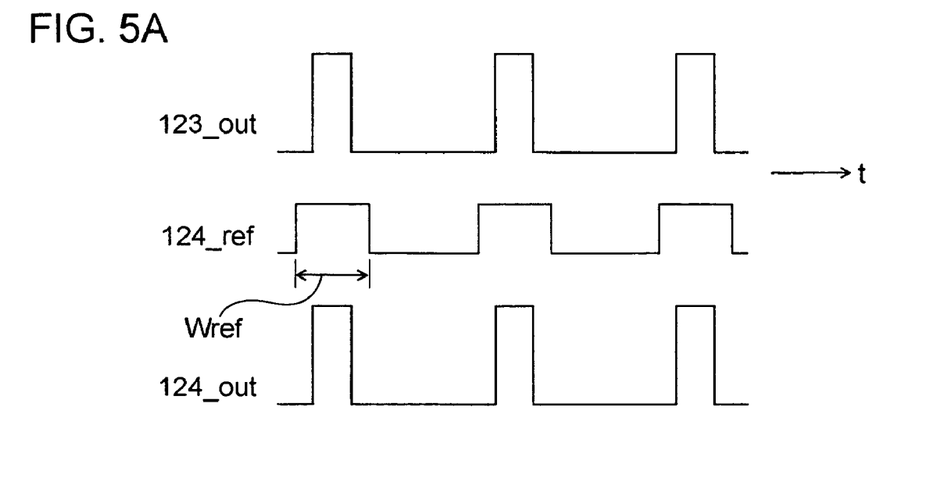
FIGS. 5A and 5B illustrate detection signal outputs obtained at the light detecting unit.

Therefore, when the horizontal scanning portion 105a is driven by a drive signal, which can have a form like that of a sinusoidal wave, the modulation spots 130 and 131 that are subjected to scanning pass the light detecting unit 122 at a certain interval, so that a signal 123_out shown in FIG. 5A is output from the drive circuit 123.

In the first exemplary embodiment, a first determining unit 124 for determining whether the signal 123_out is output at a predetermined time interval (for example, between 1/30 seconds to 1/180 seconds) is disposed. The first determining unit 124 compares the signal 123_out output from the driving circuit 123 with a reference signal 124_ref that is referred to at a predetermined interval.

Here, a width Wref of an ON signal of the reference signal 124_ref (a time interval corresponding to a timing at which the signal 123_out is output) is set at a time interval that is slightly wide for facilitating displacement of the horizontal scanning portion 105a.

In other words, by comparing the signal 123_out output from the driving circuit 123 with the ON signal of the reference signal 124_ref at the first determining unit 124, the first determining unit 124 outputs a determination signal 124_out at a predetermined interval, and determines that the horizontal scanning portion 105a of the scanning unit 105 is performing a predetermined operation.

Contemporaneously, as mentioned above, by detecting the positions of the modulation spots 130 and 131 in the respective forward path and return path on the light detecting unit 122, the displacement between the modulation spots 130 and 131 is measured and the controlling operation is performed so that there is no positional displacement, in order to display a proper image.

In contrast, a case in which, for some reason, the scanning unit 105 no longer operates predeterminately or properly, such as the horizontal scanning portion 105a no longer operating, will be described with reference to FIG. 5B.

Figure 5B:
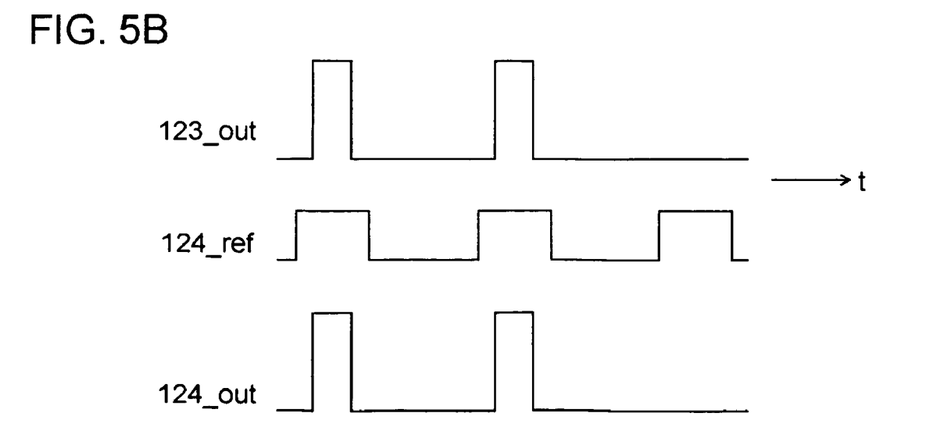

In this case, since one or both of the modulation spots 130 and 131 passing the light detecting unit 122 disappear, the signal 123_out shown in FIG. 5B is no longer output.

In other words, since the signal 123_out is no longer output even though the ON signal of the reference signal 124_ref is being output, the first determining unit 124 stops outputting the determination signal 124_out. Therefore, the first determining unit 124 determines that the scanning unit 105 has stopped operating predeterminately.

Consequently, since, in this case, an image cannot be properly displayed, the system control circuit (controlling unit) 121 causes the light source unit 101 to stop emitting light through the light source driving circuit 113.

In a modification of the first exemplary embodiment, when the first determining unit 124 determines that the scanning unit 105 is not operating predeterminately, as illustrated in FIG. 1, the system control circuit 121 causes the light source unit 101 to stop emitting light through the light source driving circuit 113, and causes driving unit 126 to drive warning unit 125 for indicating a warning or generating a warning sound.

This makes it possible to inform a user that a failure has occurred in the apparatus to, thereafter, perform an appropriate operation to correct and/or reduce the failure. When the apparatus is driven by, for example, a battery, it is possible to reduce the chance of exhaustion of the battery.

Although, in the first exemplary embodiment, only one light source unit 101 is used, light source unit, such as semiconductor lasers, emitting red, blue, and green light, respectively, and color synthesizing unit can actually be used. A color image can be formed on the surface to be scanned 107 by controlling driving of these light source unit by independent light source driving circuits on the basis of a signal of an apparatus controlling circuit, for example by turning off the light source unit or reducing the quantity of light (reducing an applied voltage).

In displaying a color image, color misalignment often occurs, thereby deteriorating the image. For example, when the two-dimensional scanning optical system 106 only comprises lenses formed of plastic, color misalignment can occur because it becomes difficult to correct chromatic aberration due to a range of dispersion of the plastic material being narrow.

However, chromatic aberration does not occur in the two-dimensional scanning optical system 106 according to the first exemplary embodiment because it comprises the two mirrors 106a and 106b. Therefore, color misalignment of the color image does not occur.

Accordingly, when light source unit which emit light beams, which can have a plurality of wavelengths are used, one can use a plurality of mirrors in the two-dimensional scanning optical system. This makes it possible to display a high-quality image without color misalignment. In the first exemplary embodiment, the two-dimensional scanning optical system comprises two mirrors to reduce light quantity loss to a very small value. In addition, since the number of parts is reduced, the structure is simplified.

Although, in the first exemplary embodiment, the unit for determining whether or not the horizontal scanning portion 105a is operated abnormally is described, it goes without saying that, if a similar determining operation is carried out, the determining unit can actually determine whether or not the horizontal scanning portion 105a and/or the vertical scanning portion 105b is operating abnormally. If the vertical scanning portion 105b is operating abnormally, for example, if it has stopped operating, light does not impinge upon the light detecting unit or impinges upon the light detecting unit at a time interval that is shorter than 1/60 seconds (predetermined time interval). Here again, the light source unit is controlled so as to turn off the power supply of the light source unit or reduce the quantity of light (applied voltage). In other words, in the embodiment, the determining unit 124 determines whether or not light (image light) is two-dimensionally scanning the surface to be scanned to control the light source unit on the basis of the result of determination (so as to, for example, reduce the voltage applied to the light source or set this voltage to zero). The determination of whether or not light two-dimensionally scans the surface to be scanned is similarly carried out in the following exemplary embodiments.

Second Exemplary Embodiment

A second exemplary embodiment of the present invention will be described. The basic structure of the second exemplary embodiment is substantially the same as that shown in FIG. 1.

In the first exemplary embodiment, an image sensor comprising a plurality of light-receiving areas is used as the light detecting unit 122, whereas, in the second exemplary embodiment, light detecting unit, such as a photodiode, which detects light can be used to obtain information regarding time.

Figure 6:
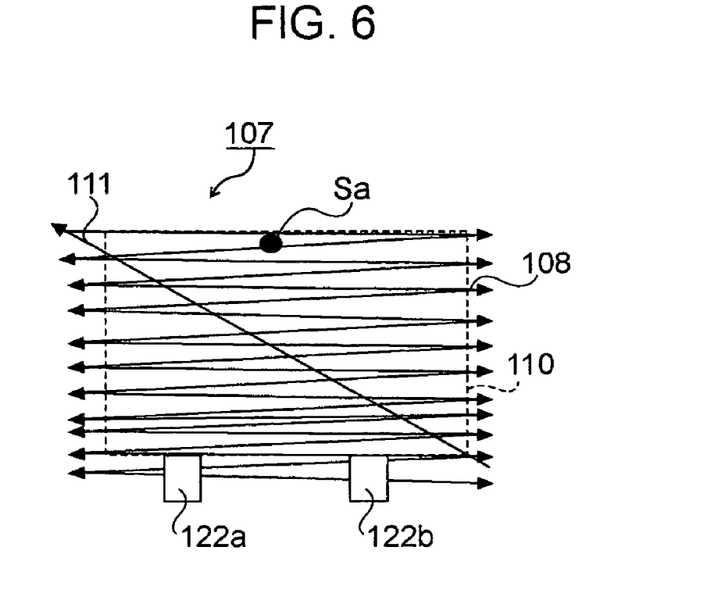
FIG. 6 illustrates a light detecting unit in a second exemplary embodiment of the present invention.

FIG. 6 is a schematic view of a scanning state of a scanning light beam Sa scanning a surface to be scanned 107. Reference numeral 110 denotes an effective area (effective area) for actually displaying an image. Reference numeral 108 denotes an example of a scanning line. A plurality of such scanning lines 108 are used in the illustrated order to perform raster scanning with respect to the surface to be scanned 107.

Light detecting unit 122a and 122b are actually disposed at locations corresponding to that shown in FIG. 2. Here, the light detecting unit 122a and 122b are illustrated as being superimposed upon the scanning lines 108 on the surface to be scanned 107 to describe their operations.

The light detecting unit 122a and 122b are disposed at the surface to be scanned 107 so as to be situated outside the effective area 110 where an image is actually displayed. The light detecting unit 122a and 122b are electrically connected to a synchronization detecting circuit (not shown) and a control circuit (not shown) of an image display apparatus. A controlling operation is performed on the basis of signals from the light detecting unit 122a and 122b.

In the second exemplary embodiment, horizontal scanning is performed in a reciprocating manner by an oscillating movement operation, and vertical scanning is performed in a direction perpendicular to the horizontal scanning direction. After performing the vertical scanning, such scanning operations can be repeated through a return line indicated by an arrow 111.

In FIG. 6, the surface to be scanned 107 has the effective area 110, which is an area where an image is actually displayed, and an overscan area, which is an area other than the effective area 110 in the horizontal and vertical directions. A predetermined image is displayed in the effective area 110. At the overscan area where the light detecting unit 122a and 122b are disposed, light source unit continuously emits light to detect a synchronization signal. Light signals 122a_out and 122b_out obtained at the respective light detecting unit 122a and 122b, which detect the light continuously emitted from the light source unit, are illustrated in FIG. 7.

The light detecting unit 122a and 122b detect a time interval tw of between modulation spots (light beams) that are detected. For example, when a difference between a forward path and a return path is considered with reference to the forward path where scanning is performed in the direction of the scanning lines 108, a detection interval 122a_w of the light detecting unit 122a is longer than a detection interval 122b_w of the light detecting unit 122b in the horizontal scanning direction in which scanning is performed in a reciprocating manner by a oscillating movement operation. By adjusting a timing at which the modulation spots are formed by using the detection times, proper pixel positions in the forward path and the return path are controlled.

Figure 7:
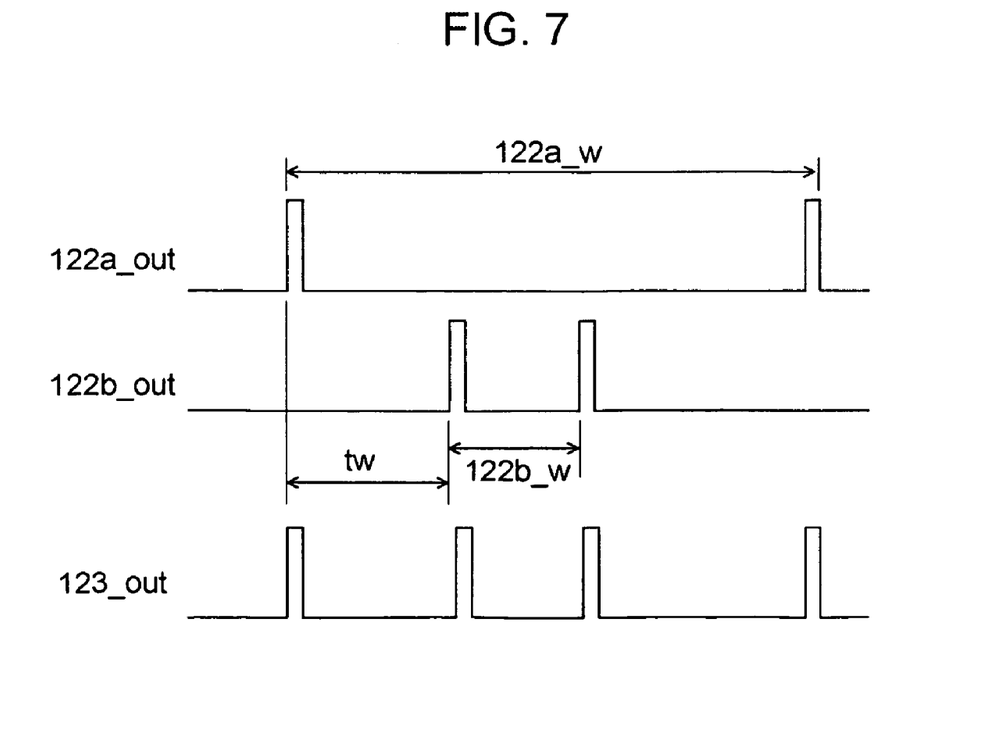
FIG. 7 illustrates signal outputs of a main portion in the second exemplary embodiment of the present invention.

In the second exemplary embodiment, when the signal output 122a_out of the light detecting unit 122a and the signal output 122b_out of the light detecting unit 122b are added together in a time series, the result is a signal 123_out shown in FIG. 7. In other words, since scanning unit 105 is properly driven, and the modulation spots that are subjected to scanning in the forward path and the return path pass the light detecting unit 122a and 122b at a predetermined interval, a driving circuit 123 outputs the signal 123_out shown in FIG. 7.

As described with reference to FIG. 5, the first determining unit 124 configured to determine whether the output signal 123_out is output from the driving circuit 123 at a predetermined time interval compares the output signal 123_out output from the driving circuit 123 with a reference signal 124_ref (not shown). Here, a width of an ON signal of the reference signal 124_ref (a time interval corresponding to a timing in which the signal 123_out is output) is set at a time interval that is slightly wide for facilitating displacement of the scanning unit 105.

In other words, by comparing the output signal 123_out output from the driving circuit 123 with the ON signal of the reference signal 124_ref at the first determining unit 124, the first determining unit 124 outputs a determination signal 124_out at a predetermined interval (refer to FIG. 5A), and determines that a horizontal scanning portion 105a of the scanning unit 105 is performing a predetermined operation.

Contemporaneously, as mentioned above, by detecting the time interval of the modulation spots in the forward path and return path on the light detecting unit 122, the displacement between the modulation spots is measured and the controlling operation is performed so that there is no positional displacement, in order to display a proper image.

When, for some reason, the scanning unit 105 stops operating properly (for example, the horizontal scanning portion 105a stops operating), since the modulation spots passing the light detecting unit 122a and 122b disappear, the signal 123_out is no longer output.

For example, the horizontal time interval is no longer set at the predetermined time interval when a vertical scanning portion is damaged.

In other words, since the signal 123_out is no longer output even though the ON signal of the reference signal 124_ref (not shown) is being output, the first determining unit 124 stops outputting the determination signal 124_out (see FIG. 5B). Therefore, the first determining unit 124 determines that the scanning unit 105 has stopped operating predeterminately.

Consequently, since, in this case, an image cannot be properly displayed, a system control circuit 21 causes light source unit 101 to stop emitting light through a light source driving circuit 113.

In a modification of the second exemplary embodiment, when the first determining unit 124 determines that the scanning unit 105 is not operating predeterminately, the system control circuit 121 causes the light source unit 101 to stop emitting light through the light source driving circuit 113, and causes driving unit 126 to drive warning unit 125 for indicating a warning or generating a warning sound.

This makes it possible to inform a user that a failure has occurred in the apparatus to thereafter perform an appropriate operation for correcting and/or reducing failure. When the apparatus is driven by, for example, a battery, it is possible to reduce the chance of exhaustion of the battery.

Third Exemplary Embodiment

Figure 8:
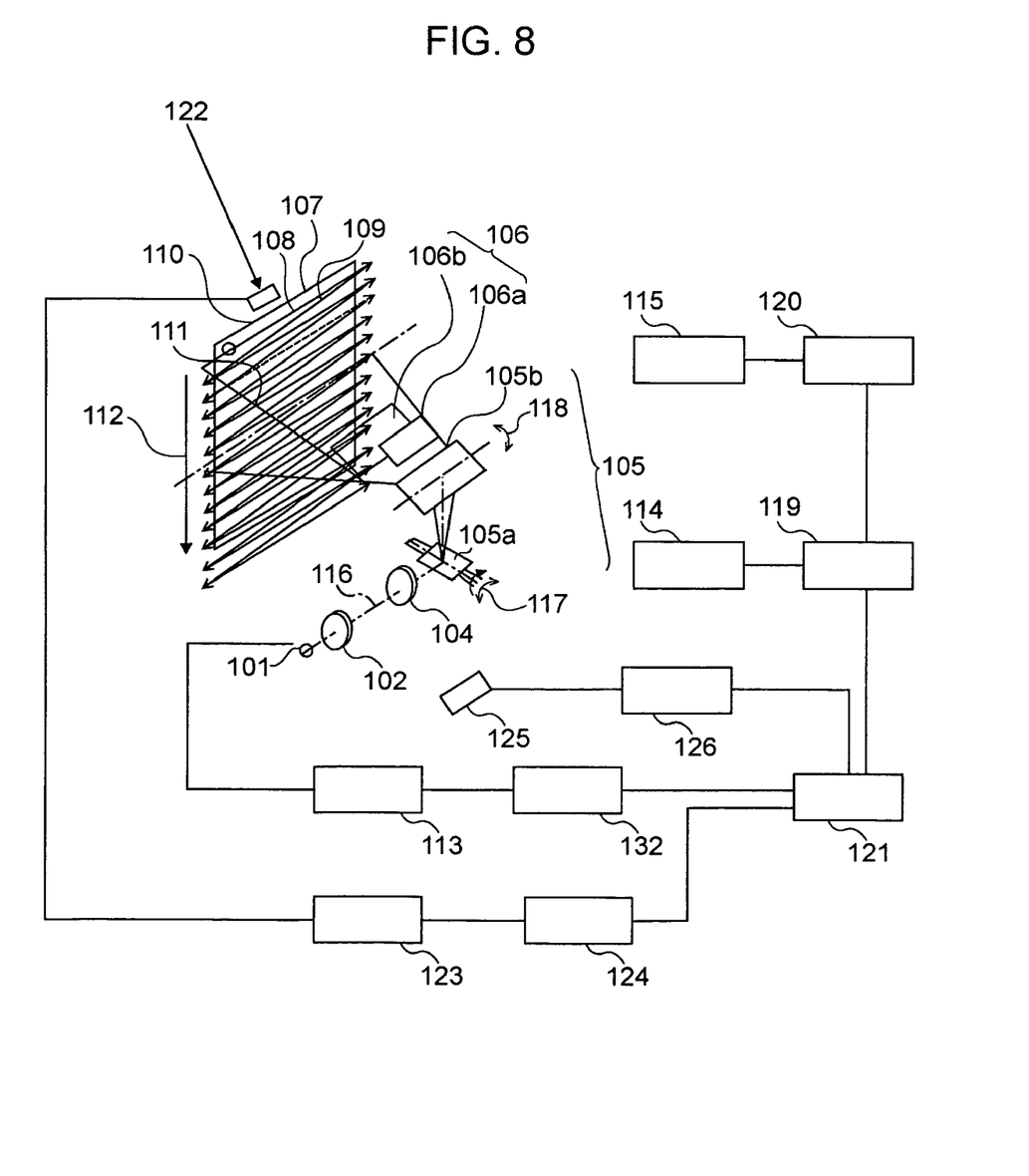
FIG. 8 is a schematic view of a structure according to a third exemplary embodiment of the present invention.

A third exemplary embodiment of the present invention will be described with reference to FIG. 8. Parts, which can have the same reference numerals as those in the first exemplary embodiment have the same functions. In each of the first and second exemplary embodiments, the driving of the light source unit is controlled by only using a signal from the light detecting unit 122 or each of the light detecting unit 122a and 122b. In contrast, in the third exemplary embodiment, a light output determining unit 132 is further provided. The light output determining unit 132 can use an output from light detecting unit (monitoring unit), which detects a light output of the light source unit, to determine whether or not this output is equal to a predetermined output.

For example, the monitoring unit (not shown) which monitors a light output from light source unit 101 is disposed in a light source driving circuit 113. A system controlling unit 121 controls the driving of the light source unit 101 by using a determination signal from the light output determining unit 132 and a determination signal from first determining unit 124. The light output determining unit 132 determines whether or not the output from the monitoring unit is equal to a predetermined output. The first determining unit 124 determines whether or not scanning unit 105 is operating predeterminately by a signal from light detecting unit 122 which receives a light beam used for measuring an interval between the positions of modulation spots on a surface to be scanned 107.

A horizontal scanning portion 105a in the scanning unit 105 used in the third exemplary embodiment is formed so as to oscillating movement by a mechanical resonant action, and the light detecting unit 122 is disposed at a substantially central portion of the surface to be scanned 107 outside an effective area 110.

Therefore, when the horizontal scanning portion 105a is driven by a drive signal, which can have a form like that of a sinusoidal wave, light spots that are subjected to scanning in a forward path and in a return path, respectively, pass the light detecting unit 122 at a certain interval, so that the aforementioned signal 123_out shown in FIG. 5A is output from a drive circuit 123.

In an apparatus of the third exemplary embodiment, the first determining unit 124 for determining whether this output is performed at a predetermined time interval is disposed. The first determining unit 124 compares the signal 123_out output from the driving circuit 123 with a reference signal 124_ref that is referred to at a predetermined interval. Here, a width Wref of an ON signal of the reference signal 124_ref (a time interval corresponding to a timing at which the signal 123_out is output) is set at a time interval that is slightly wide for facilitating displacement of the horizontal scanning portion 105a.

In other words, by comparing the signal 123_out output from the driving circuit 123 with the ON signal of the reference signal 124_ref at the first determining unit 124, the first determining unit 124 outputs a determination signal 124_out at a predetermined interval, and determines that the horizontal scanning portion 105a of the scanning unit 105 is performing a predetermined operation.

Contemporaneously, as mentioned above, by detecting the positions of modulation spots 130 and 131 in a forward path and a return path, respectively, on the light detecting unit 122, the displacement between the modulation spots 130 and 131 is measured and the controlling operation is performed so that there is no positional displacement, in order to display a proper image.

In the third exemplary embodiment, the driving of the light source unit 101 is controlled by also using the output from the monitoring unit which detects the light output from the light source unit 101.

Figure 9:
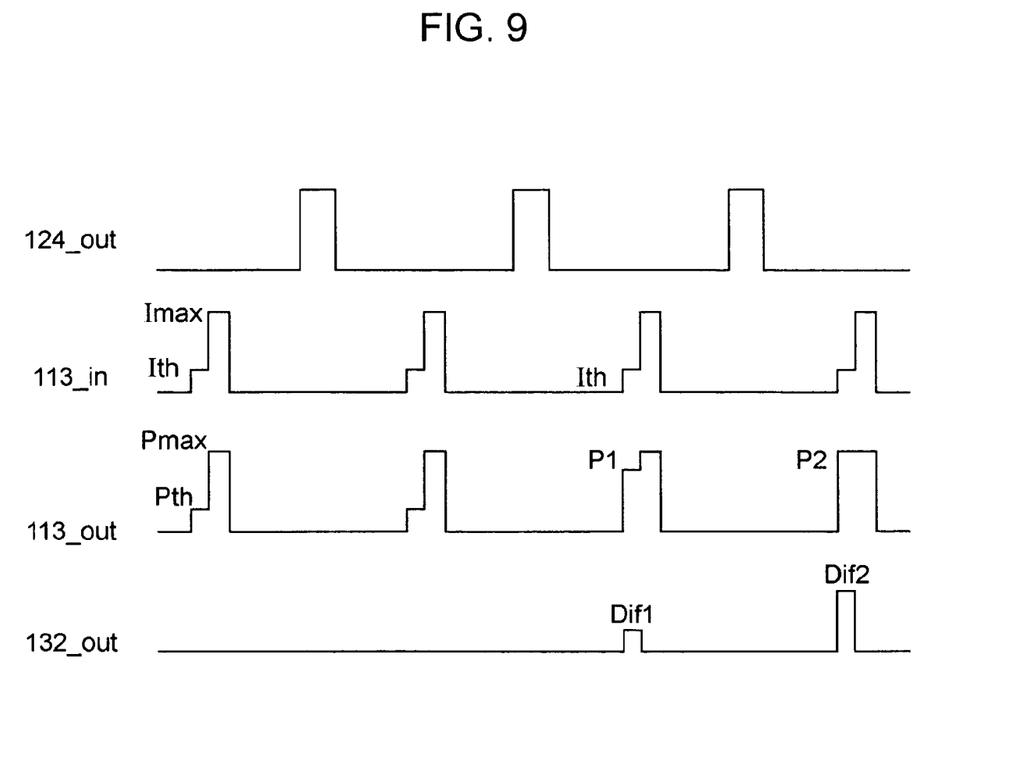
FIG. 9 illustrates signal outputs of a main portion in the third exemplary embodiment of the present invention.

FIG. 9 illustrates the determination signal 124_out from the first determining unit 124, a drive signal 113_in used for driving the light source unit 101, a light output signal 113_out output from the monitoring unit which monitors the light output from the light source unit 101 (not shown), and a determination signal 132_out output from the light output determining unit 132 which determines whether or not the output signal 113_out is equal to a predetermined output value.

Ordinarily, the light source driving circuit 113 causes scanning once every one frame (corresponding to a display of an image having an injection current slightly larger than a threshold light-emission value of the light source unit 101 and a current Imax providing a maximum light quantity) by a scanning line, which is an nth scanning line outside the effective area 110 (where an image is displayed) from, for example, a vertical synchronization signal. Here, the current values Ith and Imax forming two steps are input, and a photodetector disposed in the light source unit 101 (not shown) or outside the light source unit 101 detects light outputs of these values to control the light source unit 101 so that it operates predeterminately.

FIG. 9 shows the injection current Ith and the maximum current Imax, which indicate this control state. When an image is being displayed, a drive current signal corresponding to an image signal is modulated and input between control signals of these current values. However, this is not shown in FIG. 9.

FIG. 9 shows an example in which, with respect to the injection current Ith of a third of these control signals (third frame), a value of the light output 113_out from the light output monitoring unit is equal to an output value P1, which exceeds an output value Pth.

Similarly, with respect to the injection current Ith of a fourth of these control signals (fourth frame), a value of the light output 113_out is equal to an output value P2. The light output determining unit 132 which determines whether or not this output value is equal to a predetermined value determines the difference between the injection current waveform, serving as a reference waveform, and a light-quantity output waveform to obtain the determination signal 132_out shown in FIG. 9.

In other words, even though the determination signal 124_out, which indicates that the driving state of the scanning unit is a normal driving state, is being output from the first determining unit 124, signal outputs Dif1 and Dif2 occur in the output from the light output determining unit 132. Therefore, the first determining unit 124 determines that some kind of abnormality has occurred in the light source unit 101.

In this case, since an image cannot be properly displayed, the system control circuit 121 causes the light source unit 101 to stop emitting light through the light source driving circuit 113.

A modification of the third exemplary embodiment relates to a case in which an abnormality has occurred in the determination signal 132_out output from the light output determining unit 132, which determines whether or not the output of the driving signal 113_out from the monitoring unit is equal to a predetermined output, even though the first determining unit 124 has determined that the scanning unit 105 is operating predeterminately. In such a case, the system control circuit 121 causes the light source unit 101 to stop emitting light through the light source driving circuit 113, and causes driving unit 126 to drive warning unit 125 for indicating a warning or generating a warning sound.

This makes it possible to inform a user that a failure has occurred in the apparatus to, thereafter, perform an appropriate operation to correct and/or reduce the failure. When the apparatus is driven by, for example, a battery, it is possible to reduce the chance of exhaustion of the battery.

As can be understood from the foregoing description, in each of the exemplary embodiments, when an abnormality occurs in the image display apparatus, the user can be informed about the abnormal state to, thereafter, perform an appropriate operation to correct and/or reduce the abnormality. In addition, when the apparatus is driven by, for example, a battery, it is possible to prevent or reduce exhaustion of the battery.

While the present invention has been described with reference to exemplary embodiments, it can be understood that the invention is not limited to the discussed exemplary embodiments. The scope of the following claims can be accorded the broadest interpretation so as to encompass all modifications, equivalent structures and functions.

This application claims the benefit of Japanese Application No. 2005-181988 filed Jun. 22, 2005, which is hereby incorporated by reference herein in its entirety.

What is claimed is:

1. An image display apparatus which displays an image on a surface to be scanned, the apparatus comprising:
   a light source unit configured to emit a light beam modulated on the basis of image information;
   a scanning unit configured to scan the surface to be scanned with the light beam emitted from the light source unit;
   a light detecting unit configured to receive the light beam that is incident upon an area other than an image display area of the surface to be scanned when the surface to be scanned is scanned with the light beam;
   a determining unit configured to determine whether or not an output signal from the light detecting unit is output at a predetermined time interval; and
   a controlling unit configured to control driving of the light source unit on the basis of a determination signal from the determining unit.

2. The image display apparatus according to claim 1, further comprising a monitoring unit configured to monitor a light output from the light source unit and a light output determining unit configured to determine that an output from the monitoring unit is equal to a predetermined output, wherein the controlling unit controls the driving of the light source unit by using a determination signal from the light output determining unit and the determination signal from the determining unit.

3. The image display apparatus according to claim 1, further comprising a warning unit configured to generate a warning sound or indicating a warning on the basis of the determination signal from the determining unit, the warning unit being controlled by the controlling unit.

4. The image display apparatus according to claim 1, further comprising an optical system which guides the light beam from the scanning unit to the surface to be scanned, the optical system including two non-rotational symmetrical aspherical mirrors.

5. The image display apparatus according to claim 1, wherein the scanning unit includes a reflecting-type deflecting unit which resonates, the image being formed on the surface to be scanned in a forward path and in a return path, the forward path and the return path being defined by oscillating movement of the deflecting unit resulting from the resonation of the deflecting unit.

6. The image display apparatus according to claim 1, wherein a display position of the image that is formed on the surface to be scanned in a forward path and in a return path defined by the scanning unit that oscillating movements is adjusted by the signal from the light detecting unit.

7. The image display apparatus according to claim 1, wherein the controlling unit stops driving the light source unit when a determination signal from light output determining unit indicates an abnormal operation and the determination signal from the determining unit indicates a normal operation.

8. The image display apparatus according to claim 1, wherein the light beam reaches the light detecting unit from the light source unit without passing outside the image display apparatus.

9. The image display apparatus according to claim 1, wherein the light beam reaches the light detecting unit from the light source unit by only passing inside the image display apparatus.

* * * * *